(12) United States Patent
Nemeth

(10) Patent No.: US 6,499,568 B1
(45) Date of Patent: Dec. 31, 2002

(54) LOCKING DEVICE

(75) Inventor: Ferenc Nemeth, Au (CH)

(73) Assignee: PWB AG, Altstatten (CH)

( * ) Notice: Subject to any disclaimer, the term of this patent is extended or adjusted under 35 U.S.C. 154(b) by 0 days.

(21) Appl. No.: 10/173,727

(22) Filed: Jun. 18, 2002

(30) Foreign Application Priority Data

Aug. 13, 2001 (EP) ............................................ 01119471

(51) Int. Cl.$^7$ .............................. B23Q 1/28; F16B 2/24
(52) U.S. Cl. ............................ 188/67; 188/265; 91/44; 92/25
(58) Field of Search ...................... 188/67, 265; 91/41, 91/44; 92/24, 25

(56) References Cited

U.S. PATENT DOCUMENTS 3,586,138 A * 6/1971 Engle ............................ 91/44
6,044,934 A * 4/2000 Nemeth ....................... 188/67

* cited by examiner

Primary Examiner—Christopher P. Schwartz
(74) Attorney, Agent, or Firm—Arnold B. Silverman; Eckert Seamans Cherin & Mellott, LLC

(57) ABSTRACT

A locking device for a movement unit supported displaceably relative to and along a longitudinal axis of at least one guide rod, comprises a pair of clamping members which have each a clamping opening. Each clamping opening has an inner surface for receiving the guide rod. Each clamping member has a foot end and a head end and is pivotable about an axis to assume a first position, in which the inner surface is in frictional braking contact with the guide rod, and a second position for allowing free relative movement of the clamping members and the guide rod. The pair of clamping members has also a corresponding pair of control surfaces facing each other at their head ends. There is an actuation device that acts onto the pair of clamping members to move them from one of their positions to the other. This actuation device includes: a device for imparting movement which has a pressure exerting surface for exerting pressure in a direction towards the clamping members. Furthermore, there is a wedge-like actuator formed by at least one body of revolution, separated from the pressure exerting surface, and being displaceable transversely to the direction towards the clamping members. The actuator is pressed by the pressure exerting surface to engage the control surfaces of the clamping members in order to pivot them into one of their positions, while rolling over the pressure exerting surface.

23 Claims, 1 Drawing Sheet

LOCKING DEVICE

FIELD OF THE INVENTION

This invention relates to a locking device for a movement unit that is supported displaceably relative to and along a longitudinal axis of at least one guide rod. The locking device comprises a pair of clamping members comprising each a clamping opening that forms an inner surface for receiving the guide rod. The clamping members have each a foot end and a head end and are pivotable about an axis to assume a first position, in which their inner surfaces are in frictional braking contact with the guide rod, and a second position for allowing free relative movement of the clamping members and the guide rod. To this end, the pair of clamping members has a corresponding pair of control surfaces facing each other at their head ends. To move the clamping members from one position into the other, there is an actuation device which acts onto the pair of clamping members. This actuation device includes a prime mover for imparting motion which comprises a pressure exerting surface for exerting pressure in a direction towards said clamping members. This motion is transferred to a wedge-like actuator separated from the pressure exerting surface to be displaceable transversely to the direction towards the clamping members. The actuator is then pressed by the pressure exerting surface to engage the control surfaces of the clamping members to pivot them into one of their positions.

BACKGROUND OF THE INVENTION

A vast variety of locking devices has already been suggested in the prior art. For example, DE-A-32 45 074 shows an example wherein lever-like clamping members extend parallel to the guide rod. The actuating device comprises a cam disk to move the clamping levers from one position into the other. However, the orientation of the clamping members parallel to the guide rod (or shaft) to be locked results in a space consuming construction.

U.S. Pat. No. 2,806,723 (FIG. 7) discloses a more compact design wherein a plunger presses a wedge-like actuator which moves the clamping members from one another to assume a respective position. This principle, in an inverted form, i.e. comprising two wedge surfaces which press the clamping members together, can be seen in U.S. Pat. No. 6,044,934. This patent discloses also that the lever-like clamping members should be guided during pivoting from one position into the other by curved guide surfaces in the region of the foot end and the pivoting axis.

This idea has been taken up according to WO 99/38645 wherein the clamping members, thus guided, are able to pivot to a considerable extent. Moreover, this document uses again a wedge member as suggested in the above-mentioned U.S. Pat. No. 2,806,723. However, this wedge is displaceable and floating relative to the pressure exerting surface of the pneumatic plunger along a parallel surface thereof. This allows a more pronounced tilting movement and, thus, better and safer clamping.

SUMMARY OF THE INVENTION

Although one was able to achieve a quite compact design by all these measures, the requirements regarding a further reduction of required space, more reliability, longer operation life and so on become higher and higher. To satisfy these requirements is one of the objects of the present invention.

In a surprising simple and very advantageous manner, this object is attained by forming the wedge-like actuator as at least one body of revolution that is able to roll over the pressure exerting surface.

Thus, instead of the usual wedge actuators which slide with friction along the control surfaces of the clamping members engaged by them, a body of revolution is used (i.e. at least one ball or a roller) which can roll over the pressure exerting surface of the actuating device so that at least part of the undesirable friction between the actuator and the clamping members is also avoided. In this way, a series of advantages is achieved, such as:

- since the body of revolution does not protrude from a surface parallel to the pressure exerting surface, the locking device is still more compact;
- this parallel surface, which up to now stifled the pivoting movement of the clamping members, and the part having this surface are omitted so that one part is saved;
- there is more pivoting freedom for the clamping members so that the pivoting stroke (and, thus, the reliability of clamping engagement) is increased, particularly as the center (in longitudinal direction) remains undefined;
- there is less wear due to rolling friction rather than the known sliding friction, thus increasing the reliability and operation life;
- assembly is made easier, because the body of revolution orients itself when engaging the control surfaces of the clamping members;
- Since the body of revolution has only punctual contact (in case of a ball) or line contact (in case of a roller which is preferred) with the pressure exerting surface, no tilting forces act onto the latter surface, i.e., in the case of a plunger with such a surface, that the plunger can move linearly within its cylinder without any risk of jamming;
- this, in turn, means that the plunger itself can be shorter (in the direction of its movement), i.e. it needs less surface to be linearly guided in the cylinder which favorizes further a compact design.

In the case of a roller as a body of revolution, it could have different diameters over its length to be, for example, smaller in the middle (or larger) than at its ends, the control surfaces of the clamping members preferably corresponding to this variation in diameter and are, for example convex. However, a cylindrical roller is preferred.

Since the pivoting stroke is larger according to the invention, it is of special benefit if the locking device comprises those characteristics which are described in U.S. Pat. No. 6,044,934.

Since the clamping members are enabled, according to the invention, to pivot over a larger stroke than according to the prior art, it is useful to form the inner surface of at least one clamping member with a substantially convex cross-section when seen in the direction of longitudinal axis of the guide rod. "Substantially convex" does not mean that it must be uniformly curved, but means that it could also be prismatic or cornered. In this way, a relative large area of the inner surface will engage the rod (or shaft) and will ensure a large locking force.

Since a body of revolution has a generally wedge-like shape, i.e. its width increases up to its middle, the clamping members could, in principle, be completely straight so as to extend in the direction of the actuation movement. However, it is preferred if the control surface is formed as a tread surface for said body of revolution under an angle to the direction of movement of the actuating device. In this way, the additional advantage is achieved that a special return motion device for the actuating device, as had been provided in the prior art either as a spring seated between the clamping members or a spring which acts onto the actuating device itself, is no longer necessary. This results in a simplification of the design and a cost saving production.

If the body of revolution is dimensioned so as to penetrate in each of the positions of said clamping members deeper between their control surfaces than it projects over their head ends towards said pressure exerting surface, a kind of cage bearing for the body of revolution is achieved which ensures its position between the clamping members.

The movement imparting means can be of any type, e.g. formed by an electromagnet. Preferably, however, it comprises a fluidically actuable plunger.

BRIEF DESCRIPTION OF THE DRAWINGS

Further details of the invention will become apparent from the following description of a preferred embodiment schematically illustrated in the drawings in which

FIG. 3 when the rod or shaft is shifted to the left, and FIG. 4 when the rod or shaft is shifted to the right.

DETAILED DESCRIPTION OF THE DRAWINGS

Figure 1:
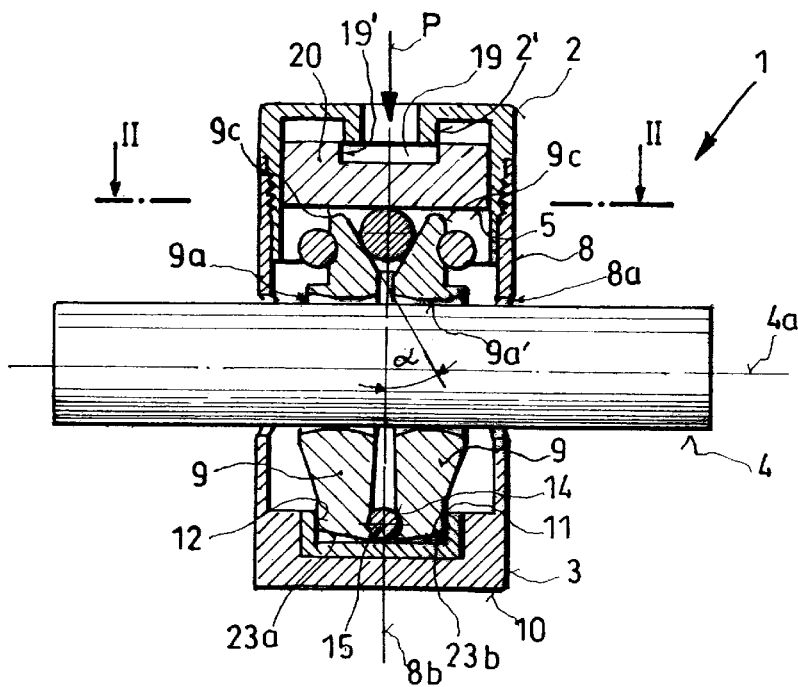
FIG. 1 is a cross-sectional view of the locking device in released position according to the present invention along the line I—I of FIG. 2.

FIG. 1 shows a locking device 3 of a linear motion unit 1. The locking device is either displaceable along a rod 4 or a rod axis 4a or vice-versa, because in the present case only the relative movement is of importance. Likewise, the length of the rod does also not matter and, if desired, the rod could also be curved, e.g. to form a circle. The rod 4 extends through at least one sliding bearing (not shown), the details of which could be seen in U.S. Pat. No. 6,044,934 the contents of which should be considered as disclosed by reference. The term "linear motion unit", as used herein, should be understood in the broadest sense, because it has also been suggested in the prior art to arrange such a locking device so as to face the inner surface or a revolving wheel so that, in this case, the longitudinal axis of the linear motion unit forms, in fact, a circle.

Figure 2:
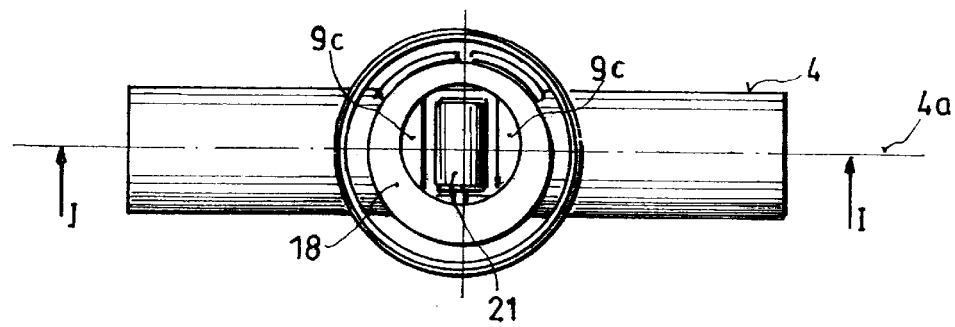
FIG. 2 is a plan view in the sense of the line II—II of FIG. 1 showing the front sides of the clamping members and a roller which forms the body of revolution according to the invention.

The locking device 3 comprises a, for example cylindrical, cylinder or clamping housing 8 along a receiving axis 8b wherein two, preferably at least partially cylindrical (FIG. 2) clamping members 9 are pivotally held. The cylinder or clamping housing 8 is closed at its head end by a plunger receiving housing 2 screwed on it. Both the cylinder housing 8 and the clamping members 9 comprise through openings 8a and clamping openings 9a for allowing the rod 4 to penetrate.

Figures 3, 4:
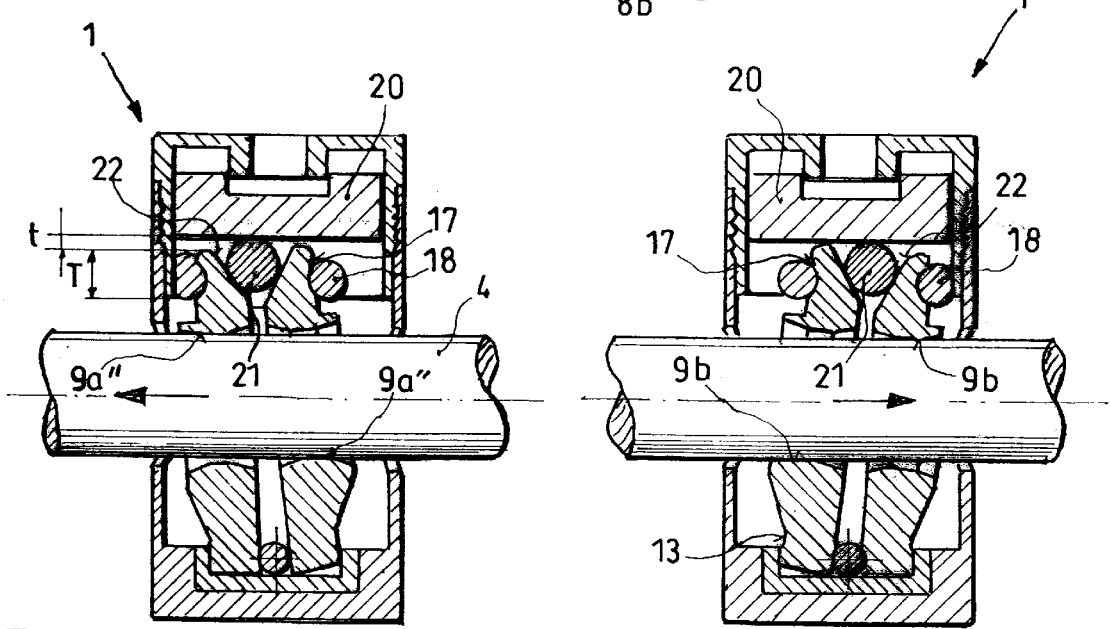
FIGS. 3 and 4 illustrate each the locking device in locking position, i.e.

The clamping openings 9a are adapted to the cross-section of the rod 4 in such a manner that they engage the rod 4 in each of the locking positions shown in FIGS. 3 and 4 (the first or clamping position) and clamp it, while in a second position shown in FIG. 1 the rod is freely movable within the openings 9a. It is advantageous if the inner surface 9a' of the clamping openings 9a have a convex shape in cross-section along the axis 4a, as may be seen in FIGS. 1, 3 and 4, which is preferably rather polygon as shown, so that the upper left partial surface 9a" of the left clamping member 9 and the lower right partial surface of the right clamping member 9 engage an area (rather than linearly, as in the prior art) of the rod 4, whereas partial surfaces 9b engage the rod 4 and fix it frictionally in the position according to FIG. 4.

The pivoting movement between the two positions of FIG. 1 and FIG. 3 (or FIG. 4) is preferably guided by the same construction as disclosed in U.S. Pat. No. 6,044,934, i.e. by supporting the two clamping members 9 within the cylinder housing 8 guiding the pivoting movement by the rod 4 penetrating the clamping openings 9a so that with a movement of the rod 4 to the left the position according to FIG. 3 will result, while with a movement of the rod 4 to the right the clamping members will assume the position according to FIG. 4. The cylinder housing 8 has preferably a foot portion 10 comprising a guiding recess 11 at the foot end, the recess being preferably formed as a cylindrical bore along the receiving axis 8b and serving as a second guide surface 12 at least in part. A foot end of the clamping members 9 are inserted into the guiding recess 11 and are provided in this region with a first guide surface 13 (see FIG. 4) which is either partially spherical or cylindrical. For the guiding recess 11 could, alternatively, have a substantially rectangular cross-section (when seen in plan view) in which case the first guide surfaces 13 would form a partial cylinder whose cylinder axis is aligned with the pivoting axis defined by a pin 15. In this connection, the clamping members 9 are provided with third guide surfaces 14 facing each other to embrace the pin 15 which, as mentioned above, is aligned to the pivoting axis and ensures that the clamping members 9 cannot be shifted in the direction of their length. The foot ends of the clamping members 9 and the pin 15 are dimensioned in such a manner that they fit into the guiding recess 11 substantially without any play. Optionally, only one pair of guide surfaces 12, 13 or 14, 15 is used. In addition, it is advantageous if the foot end of at least one of said clamping members 9 comprises a curved tread surface 23a and 23b as a second guide surface to roll on the opposite guide surface of the foot portion 10.

This design is known from U.S. Pat. No. 6,044,934, but is of special benefit in connection with the present invention, as described below, because the invention enables a much. larger pivoting stroke than possible up to now for which reason the above discussed pivoting guidance is of special importance.

In order to bias the clamping members 9 in a first or clamping position (FIGS. 3, 4), at least one biasing device is provided which, in the embodiment shown, comprises a spring element, preferably in the form of an elastic ring or ribbon 18, inserted into grooves 17 near the head ends 9c of the clamping members 9. When the spring element 18 is farther off from the pivoting axis or the pin 15 than the clamping openings 9a, a strong clamping force is achieved. The maximum pivoting movement is restricted by the dimensions of the cylinder housing 8, as best seen in FIGS. 3 and 4.

The open end of the cylinder or clamping housing 8 (the upper end in the figures) is closed by a cylindrical space 19 for actuating and moving the clamping members 9 from the clamping position shown in FIGS. 3 and 4 into the released position of FIG. 1 and vice-versa. This cylindrical space 19 houses a plunger 20 serving as a prime mover for actuation of the clamping members 9. Although the use of a plunger, particularly a fluidic and preferably a pneumatic plunger, is preferred, the armature of an electromagnet or any other actuating device could be used.

It may be seen that the cylindrical wall 19' of the bore hole in the plunger 20 that forms the cylindrical space 19 cooperates with a tubular wall 2' of the housing 2 for guiding the plunger 20 at the radially inner side, whereas a radial outer wall of the plunger engages sealingly the wall of the housing 2 and, thus, forms an outer guiding surface. By this double guidance, the plunger 20 is enabled to be relative short in axial direction without risking tipping or cogging of the plunger 20 within the housing 2. However, it is to be understood that the guidance could also be formed in a different manner, for example by forming the inner guidance by at least one guiding column extending eccentrically and parallely to the axis 8b from the lid surface of the receiving housing 2. Moreover, a guidance could be formed by a longitudinal protrusion of the wall 2' of the receiving housing 2, which engages an axial groove at the periphery of the plunger 20, but in each case it is preferred if one of the guiding surfaces is arranged more in a radial inner range, while another guiding surface (normally the peripheral surface of the plunger) is in a radial outer range. It will be clear to those skilled in the art that more than one inner and outer guiding surface could be used.

The connection between the cylinder housing 8 and the cap-shaped receiving housing 2 for receiving the plunger 20 within the cylindrical space 19 is formed as a screw connection, as mentioned above, but could optionally be formed as a plug-in connection or any connection known per se. The plunger 20 posses a pressure exerting surface 5 extending transversely to its actuation movement and preferably being downwards directed. This pressure exerting surface 5 is preferably flat, but could form a convex or concave tread for a body of revolution 21, if desired. This body of revolution 21 could be formed by a series of balls arranged along a line, or even by a single ball. Preferably, however, the body of revolution is formed as a roller 21, as may particularly be seen in the plan view of FIG. 2. While the actuator according to the prior art was formed as a wedge of plastic material and, therefore, was subjected to wear and, in cases of an elevated temperature of operation, even to a deformation which could endanger the reliability of its function, the body of revolution according to the present invention is preferably made of metal, particularly of steel. In this way, the operation life-time and reliability are improved.

Since a body of revolution, as particularly the roller 21, has a cross-section which increases in thickness up to its middle and, therefore, could be called "wedge-shaped" in a broader sense, the roller 21 serves for widening or spreading the two lever-like clamping members 9 from one another against the force of the elastic ring 18 when air under pressure or any other pressure medium in introduced into the receiving housing and, thus, into the cylindrical space 19 in the direction of arrow P. If this is done, a partial surface 9a'' or 9b(cf. FIGS. 3, 4), which previously had engaged the rod 4, is lifted from the surface of the rod 4 and assumes the position according to FIG. 1 in which the device 1 is no longer locked in relation to the rod 4. Thus, by applying pressure to the upper side of the plunger 20, the frictional locking engagement of the clamping members 9 and the part to be locked, i.e. the rod 4, is released. Although the invention is not restricted to this mode of operation, but could also be used in cases where upon applying pressure to the plunger 20, the frictional engagement is established, the "release by pressure" mode is preferred, because it has the advantage of easily predetermining the clamping force.

Comparing the position of the plunger 20 in one of the positions of FIG. 3 or 4 with that of FIG. 1, one will see that a minimum movement of the plunger 20 relative to the cylindrical space 19 within the receiving housing 2 is sufficient to effect such switching over from one locking position into the releasing position according to FIG. 1. During this movement, the body of revolution 21 will roll over the pressure exerting surface 5 of the plunger 20 which is downwards directed. A separate return motion device for the plunger 20 or the clamping members 9 is no longer necessary. This shows that the actuation alone requires only a very short stroke of movement so that the length of the cylindrical space 19 and also the dimension of the plunger in the direction of the axis 8b can be kept short so that a more compact construction is achieved. This may be ensured in addition by dimensioning and choosing the arrangement of the plunger 20 relative to the head ends 9c of the clamping members 9 in such a way that these head ends 9c act as an end stop for the plunger 20 when the latter is put under pressure and is moved in downward direction (when seen in the drawings). In this manner, each of the positions of the plunger 20, and also of the clamping members 9, is precisely defined and a minimum motion of the plunger 20 to the effect of locking or releasing is ensured which results in a still more compact construction. Certainly, it would be possible to realite such an end stop in a different way, but the construction as described is especially simple and advantageous.

At the same time, an additional advantage is attained: Since the cylindrical space 8 together with the receiving housing 2 can be so short on the actuation side, it is possible to make the rod 4 and its longitudinal axis intersect the locking device or unit 1 or the cylindrical housing 8 at least approximately in the center of its length. This can be an advantage when mounting, because, in this case, the angular position of the unit 1 around the rod 4 is not critical.

The roller 21 is held between the free ends of the lever-like clamping members 9. Since the latters are pivotal about the pivoting axis 15, such pivoting means that the free ends of the two clamping members 9 open or separate from each other so that the roller penetrates downwards even more. This may, however, still be enhanced by providing the free ends of the clamping members 9 with tread surfaces 22 extending obliquely under an angle $\alpha$ to the axis 8b of the housing or the direction of movement of the plunger 20. Preferably the body of revolution 21 immerses between these tread surfaces 22 in such a way that the depth of penetration T (FIG. 3) is larger than the dimension t by which a portion of the body of revolution protrudes from and exceeds the free ends. By this measure, the body of revolution 21 is held in a kind of cage bearing.

In practice, it has been found that the condition of forces is actually so that the body rolls over the surfaces under all circumstances. If the rod 4 moves, for example, to the left relative to the locking device 1 (FIG. 3), while the plunger 20 and its pressure exerting surface 5 are not under pressure, the roller 21 does no longer firmly engage the pressure exerting surface 5. At the same time, the two clamping members 9 are entrained by the rod 4 due to the engagement of the partial surfaces 9a', while preferably turning about the pivoting axis 15. If the pivoting axis 15 were not present, the two clamping members 9 would also be entrained, but synchronism of the movement of both clamping members and the ordinary and desired motion would no longer be ensured. The wider the clamping members 9 pivot to the left (or to the right in case of FIG. 4), the larger is the area of the partial surfaces 9a' that engage the surface of the rod 4, and the greater is the pressure of the clamping members 9 against the rod 4. During this movement, the left clamping member 9 (FIG. 3) is rather drawn away from the roller 21 which may then roll unimpeded over the tread surface 22 of the right-hand clamping member 9. The same applies, vice-versa, to the movement to the right, as shown in FIG. 4.

What is claimed is:

1. A locking device for a movement unit supported displaceably relative to and along a longitudinal axis of at least one guide rod, said locking device comprising:

a pair of clamping members comprising each a clamping opening having an inner surface for receiving said guide rod, said clamping members having a foot end and a head end and being pivotable about an axis to assume a first position, in which said inner surface is in frictional braking contact with said guide rod, and a second position for allowing free relative movement of said clamping members and said guide rod, said pair of clamping members having a corresponding pair of control surfaces facing each other at their head ends;

actuation means acting onto said pair of clamping members to move them from one of their positions to the other, said actuation means including:

movement imparting means having a pressure exerting surface for exerting pressure in a direction towards said clamping members, and wedge-like actuator means formed by at least one body of revolution, separated from said pressure exerting surface, and being displaceable transversely to said direction towards said clamping members, said actuator means being pressed by said pressure exerting surface to engage the control surfaces of said clamping members to pivot them into one of their positions, while rolling over the pressure exerting surface.

2. Locking device as claimed in claim 1, wherein said at least one body of revolution is of metal.

3. Locking device as claimed in claim 2, wherein said at least one body of revolution is of steel.

4. Locking device as claimed in claim 1, wherein said at least one body of revolution is formed as a roller.

5. Locking device as claimed in claim 4, wherein said roller is cylindrical.

6. Locking device as claimed in claim 1, further comprising return motion means acting on said clamping means to bias them towards one of their positions.

7. Locking device as claimed in claim 6, wherein said return motion means bias said clamping means towards their second position.

8. Locking device as claimed in claim 6, wherein said return motion means comprise elastic ring means encircling said clamping means within the region of their head ends.

9. Locking device as claimed in claim 1, wherein said control surface is formed as a tread surface for said body of revolution under an angle to said direction.

10. Locking device as claimed in claim 1, wherein said body of revolution is dimensioned so as to penetrate in each of the positions of said clamping members deeper between their control surfaces than it projects over their head ends towards said pressure exerting surface.

11. Locking device as claimed in claim 1, wherein said movement imparting means comprise a fluidically actuable plunger and housing means for receiving said plunger.

12. Locking device as claimed in claim 11, wherein said fluidically actuable plunger is a pneumatically actuable plunger.

13. Locking device as claimed in claim 11, wherein the arrangement of said plunger relative to said head ends of said clamping members is dimensioned and chosen so that said head ends form an end stop for the plunger when put under fluid pressure.

14. Locking device as claimed in claim 11, wherein said clamping members assume said second position when said plunger is fluidically actuated and put under pressure.

15. Locking device as claimed in claim 1, wherein said pressure exerting surface extends transversely to said direction towards said clamping members and is flat.

16. Locking device as claimed in claim 1, which is elongate of a predetermined length, and wherein said clamping openings of said clamping members are arranged in such a way that said longitudinal axis intersects the locking device at least approximately in the center of its length.

17. A locking device for a movement unit supported displaceably relative to and along a longitudinal axis of at least one guide rod, said locking device comprising:

a pair of clamping members comprising each a clamping opening having an inner surface for receiving said guide rod, said clamping members having a foot end and a head end and being pivotable about an axis to assume a first position, in which said inner surface is in frictional braking contact with said guide rod, and a second position for allowing free relative movement of said clamping members and said guide rod, said pair of clamping members having a corresponding pair of control surfaces facing each other at their head ends;

actuation means acting onto said pair of clamping members to move them from one of their positions to the other, said actuation means including:

movement imparting means having a pressure exerting surface for exerting pressure in a direction towards said clamping members, wedge-like actuator means formed by at least one body of revolution, separated from said pressure exerting surface, and being displaceable transversely to said direction towards said clamping members, said actuator means being pressed by said pressure exerting surface to engage the control surfaces of said clamping members to pivot them into one of their positions, while rolling over the pressure exerting surface, and guide means for guiding said pivoting movement of said clamping members, said guide means including holding means for the foot ends of said clamping members;

at least first and second cooperating guide surfaces on at least one of said clamping members and said holding means, at least one of said guide surfaces being curved in cross-section so as to guide said pivoting movement of said clamping members substantially free from play.

18. Locking device as claimed in claim 17, wherein said foot end of at least one of said clamping members comprises a curved tread surface as a guide surface to roll on the opposite guide surface of said holding means.

19. A locking device for a movement unit supported displaceably relative to and along a longitudinal axis of at least one guide rod, said locking device comprising:

a pair of clamping members comprising each a clamping opening having an inner surface for receiving said guide rod, the inner surface of at least one clamping member having a substantially convex cross-section in the direction of said longitudinal axis, said clamping members being pivotable about an axis to assume a first position, in which said inner surface is in frictional braking contact with said guide rod, and a second position for allowing free relative movement of said clamping members and said guide rod, said pair of clamping members having a corresponding pair of control surfaces facing each other at their head ends;

actuation means acting onto said pair of clamping members to move them from one of their positions to the other, said actuation means including:
  movement imparting means having a pressure exerting surface for exerting pressure in a direction towards said clamping members, and
  wedge-like actuator means formed by at least one body of revolution, separated from said pressure exerting surface, and being displaceable transversely to said direction towards said clamping members, said actuator means being pressed by said pressure exerting surface to engage the control surfaces of said clamping members to pivot them into one of their positions, while rolling over the pressure exerting surface.

20. A locking device for a movement unit supported displaceably relative to and along a longitudinal axis of at least one guide rod, said locking device comprising:
  a pair of clamping members comprising each a clamping opening having an inner surface for receiving said guide rod, said clamping members having a foot end and a head end and being pivotable about an axis to assume a first position, in which said inner surface is in frictional braking contact with said guide rod, and a second position for allowing free relative movement of said clamping members and said guide rod, said pair of clamping members having a corresponding pair of control surfaces facing each other at their head ends;
  actuation means acting onto said pair of clamping members to move them from one of their positions to the other, said actuation means including:
    movement imparting means having a pressure exerting surface for exerting pressure in a direction towards said clamping members and comprising a fluidically actuable plunger and housing means for receiving said plunger, said plunger including at least two guiding surfaces for guiding it when being actuated; and
    actuator means formed by at least one body of revolution and being pressed by said pressure exerting surface to engage the control surfaces of said clamping members to pivot them into one of their positions.

21. Locking device as claimed in claim 20, wherein said guiding surfaces comprise at least one radially inner guiding surface and at least one radially outer guiding surface.

22. Locking device as claimed in claim 21, wherein said inner guiding surface is formed by a bore hole in said plunger for receiving a central axial projection of said housing means.

23. Locking device as claimed in claim 22, wherein said central axial projection of said housing means is tubular to feed said fluid.

* * * * *

UNITED STATES PATENT AND TRADEMARK OFFICE
CERTIFICATE OF CORRECTION

PATENT NO.    : 6,499,568 B1
DATED         : December 31, 2002
INVENTOR(S)   : Ferenc Nemeth It is certified that error appears in the above-identified patent and that said Letters Patent is hereby corrected as shown below:

<u>Column 6,</u>
Lines 56 and 63, "9a'" should read -- 9a" --.

Signed and Sealed this

Eleventh Day of March, 2003

JAMES E. ROGAN
*Director of the United States Patent and Trademark Office*